United States Patent Office 2,805,927
Patented Sept. 10, 1957

2,805,927

SELECTIVE CONTACT HERBICIDAL COMPOSITIONS

Philip C. Hamm, Webster Groves, Mo., assignor to Monsanto Chemical Company, St. Louis, Mo., a corporation of Delaware No Drawing. Application July 11, 1955, Serial No. 521,389

7 Claims. (Cl. 71—2.7)

This invention relates to herbicidal compositions and more specifically pertains to selective contact herbicidal compositions containing thioacetamide as their essential active ingredient. This application is a continuation-in-part of the copending application Serial No. 296,254 filed June 28, 1952, now abandoned.

In recent years numerous herbicidal compositions have been discovered which greatly aid in the production of agricultural crops. In most cases, these new compositions kill broad leaf plants but do not kill the grasses such as the small grains and corn. Also, such compositions have been used to kill weed growth in plots of cultivated woody tissue plants without killing these woody plants. Few herbicidal compositions have been discovered which will kill such obnoxious weeds as crab grass. In general, potassium cyanate or sodium arsenite are recommended for crab grass control. Unfortunately, these compounds sometimes kill the perennial lawn grasses such as blue grass. The home owners and ground keepers of parks and golf courses have long sought a means for eradicating from the lawns which they care for the highly obnoxious crab grass by some means other than digging up this weed. Even when these recommended crab grass killers are used at very low concentrations they severely injure the blue grass and make the treated turf unsightly.

It is an object of this invention to provide herbicidal compositions which will kill crab grass. It is also an object of this invention to provide a composition which will kill crab grass but will not kill blue grass. It is a further object of this invention to provide a selective contact herbicidal composition which is also useful in killing the terminal buds of certain crop plants.

The objects of this invention can be accomplished by the use of compositions containing thioacetamide as the essential active ingredient and a surface active agent admixed with a carrier. Such compositions are exceedingly useful for killing crab grass in blue grass lawns for they not only do not kill the blue grass but they also appear to stimulate the growth of the blue grass. These compositions can also be used to destroy apical dominance by killing the terminal bud of certain crop plants and permitting the growth of auxiliary or secondary buds. The above results can be achieved by the application of the compositions of this invention at a rate of from 4 to 70 pounds of thioacetamide per acre.

The preferred compositions of this invention are those containing from 0.5% to 10% by weight of thioacetamide and from 0.1% to 5% by weight of a surface active agent. These compositions can be prepared as liquid sprays employing an aqueous medium as a carrier, or by employing hydrocarbon oils as the carrier, or they can be prepared as sprayable dusts by employing finely-divided pulverulent solids as the carrier. In any case, the compositions so prepared possess the common physical property of being in a flowable form in that they can be applied with spraying and dusting equipment. Accordingly, they all consist of the active ingredient and the surface active agent incorporated in and admixed with a fluent carrier.

The use of the term "surface active agent" herein is intended to include such compounds commonly referred to as wetting agents, dispersing agents and emulsifying agents. The active agents which can be employed in the preparation of the compounds of this invention are, for example, those typified by the following general classifications: sodium and potassium salts of fatty acids known as soft and hard soaps; salts of disproportionated abietic acid known as rosin soaps; salt of the hydroxy aldehyde acids present in seaweed known as algin soaps; alkali-casein compositions; water-soluble lignin sulfonate salts; long chain alcohols usually containing 10 to 18 carbon atoms; water-soluble salts of sulfated fatty alcohols containing 10 to 18 carbon atoms; fatty acid esters of polyhydric alcohols; water-soluble salts of sulfated fatty acid amides; water-soluble esters of sulfated fatty acids; water-soluble alkyl sulfonates having on the average of 16 carbon atoms in the alkyl group; water-soluble aryl sulfonates; water-soluble alkyl aryl sulfonates; water-soluble aralkyl sulfonates; water-soluble sorbitan mono-laurates, palmitate, stearate, and oleate; condensation products of ethylene oxide with fatty acids, abietic acid, alkyl phenols and mercaptans; and others may be advantageously employed in preparing the compositions of this invention. These dispersing and wetting agents are sold under numerous trade names and may either be pure compounds, mixtures of compounds of the same general groups or they may be mixtures of compounds of different classes.

The fluent compositions of this invention can be prepared in numerous ways. For example, a simple aqueous sprayable composition can be prepared by dissolving from 0.5% to 10% by weight of thioacetamide and from 0.1% to 5% by weight of a surface active agent in water. These sprays can also be prepared as aqueous colloidal dispersions or emulsions by dissolving the thioacetamide in the smallest amount of water immiscible organic solvent which will dissolve the quantity of active ingredient to be used and then colloidally disperse this solution in water or preferably in an aqueous solution of a surface active agent by mechanical means, as with a homogenizer. Still another type of aqueous spray formulation can be prepared by first dissolving the active ingredient in the smallest amount of a water immiscible organic solvent which will dissolve the thioacetamide and then add this solution to an aqueous solution of a surface active agent.

Oil emulsions of thioacetamide can also be prepared. These compositions can be prepared merely by emulsifying thioacetamide in a hydrocarbon oil with a suitable surface active agent. The hydrocarbon oils which are preferred for such formulations are the liquid hydrocarbon oils containing 10 to 20 carbon atoms. Specific hydrocarbon oils which are useful for such formulations are the kerosenes, fuel oils, diesel oils and the like.

In some instances it might be desirable to accomplish the purposes of this invention by the use of dusting compositions. Such compositions can be conveniently prepared by thoroughly admixing thioacetamide and a surface active agent with a finely-divided pulverulent solid as the carrier. Suitable materials for such carriers are clay, talc, diatomaceous earths, bentonites, and the like. A convenient method for the preparation of such dust compositions is as follows: the desired quantity of surface active agent is dissolved in a small quantity of water, to this aqueous solution there is added a sufficient quantity of a pulverulent solid to form a rather thick paste, the paste is dried, finely ground added to the active ingredient, and the resulting mixture ball milled together until a homogeneous mixture is formed. This mixture can then be diluted with additional quantities of pulverulent solids until the desired concentration of the wetting agent and thioacetamide are obtained.

The following specific examples illustrate specific compositions of this invention as well as illustrating their selective herbicidal activity against crab grass. These tests were carried out in the greenhouse with blue grass sod in flats of 300 square inches in area. The sprays were applied with an atomizer at a volume rate of 30 cc. per flat.

*Example I*

An aqueous solution was prepared containing 5% by weight of thioacetamide and 1.25% by weight of a liquid surface active agent containing about 65% by weight of the product of the condensation of ethylene oxide with abietic acid and about 35% by weight of an alkyl amine salt of an alkylaryl sulfonic acid. This composition when sprayed on a bluegrass containing young 4 to 6 days old, crab grass plants at the rate of 50 to 70 pounds of thioacetamide per acre gives a complete kill of the crab grass in six days. There is but slight tip injury to the blue grass but by the sixth day after treatment there was vigorous new growth.

*Example II*

The composition of Example I after dilution with additional water to a composition contaiing 4% by weight of thioacetamide and 1% by weight of the surface active agent when applied to a blue grass containing crab grass plants 4 to 6 days old at the rate of 40 to 56 pounds of thioacetamide per acre results in a complete kill of the crab grass in about seven days. The blue grass shows but very slight tip injury a few days after treatment but by seven days after treatment, there is new vigorous growth.

*Example III*

Aqueous compositions containing 3% by weight of thioacetamide and 0.75% by weight of the surface active agent of Example I, 2% by weight of thioacetamide and 0.5% by weight of the same surface active agent and a composition containing 1% by weight of thioacetamide and 0.25% by weight of the same surface active agent were prepared. These compositions applied at the rate of 10 to 40 pounds per acre produce very severe injury to young crab grass plants but kill mature crab grass plants in six to eight days. The following test was conducted with an established blue grass lawn.

*Example IV*

Aqueous compositions containing 0.5%, 1.0% and 2.0% by weight of thioacetamide and about 1.0% by weight of the surfactant described in Example I were each sprayed on separate marked areas of established blue grass sod containing young crab grass, before the fourth leaf appeared on the crab grass, at the rate of five pounds of thioacetamide per acre. Six days after treatment the injury to the crab grass is very severe and result in a kill of over 60%.

Portions of the treated areas were resprayed with the same composition and at the same rate of application as the initial treatment and results in a substantially complete kill of the young crab grass plants.

*Example V*

Dust compositions containing from 87% to 92% pulverulent solid such as Mississippi bentonite, 0.5% to 3% by weight of surface active agent, such as described in Example I or sodium lauryl sulfate, and from 7.5% to 10% by weight of thioacetamide will kill both mature crab grass and the young, more resistant, crab grass when applied at the rate of 10 to 20 pounds of thioacetamide per acre.

Any of the other types of fluent formulations can be employed in the control and eradication of crab grass from perennial grasses especially blue grass with results comparable to those described in the illustrative examples.

The specific formulations described and employed in the illustrative examples are not intended to be limiting, for as hereinbefore stated, the precise proportions of the ingredients can be varied, other surface active agents can be substituted for those employed in these specific formulations and other fluent carriers can be employed where desired or when advantageous. These modifications and variations are believed to be obvious to those skilled in the art.

What is claimed is:

1. A selective herbicidal composition comprising 0.5% to 10% by weight of thioacetamide and from 0.1% to 5% by weight of a surface active agent admixed with a finely-divided pulverulent carrier.

2. A selective herbicidal composition comprising an aqueous solution consisting of from 0.5% to 10% by weight of thioacetamide and from 0.1% to 1% by weight of a liquid surface active agent containing about 65% by weight of the product of the condensation of ethylene oxide with abietic acid and about 35% by weight of an alkylamine salt of an alkylaryl sulfonic acid.

3. The method of selectively killing crab grass growing in perennial lawn grass plots which comprises applying to said lawn grass plots a composition comprising from 0.5% to 10% by weight of thioacetamide and from 0.1% to 5% by weight of a surface active agent admixed with a fluent carrier, at the rate of 4 to 70 pounds of thioacetamide per acre.

4. The method of selectively killing crab grass growing in a blue grass plot which comprises applying to said blue grass plot a composition comprising from 0.5% to 10% by weight of thioacetamide and from 0.1% to 5% by weight of a surface active agent in aqueous solution, at the rate of 4 to 70 pounds of thioacetamide per acre.

5. The method of selectively killing crab grass growing in a blue grass plot which comprises applying to said blue grass plot an aqueous solution comprising from 0.5% to 10% by weight of thioacetamide and from 0.1% to 1% by weight of a liquid surface active agent consisting from about 65% by weight of the product of condensation of ethylene oxidation with abietic acid and from about 35% by weight of an alkylamine salt of an alkylaryl sulfonic acid, at the rate of 4 to 70 pounds of thioacetamide per acre.

6. The method of selectively killing crab grass growing in a blue grass plot which comprises applying thioacetamide to said blue grass plot in an amount sufficient to destroy the crab grass.

7. The method of selectively destroying crab grass growing in the presence of perennial lawn grasses which comprises applying thioacetamide in an amount sufficient to destroy the crab grass.

References Cited in the file of this patent

UNITED STATES PATENTS 2,604,409    Cothran _____ July 22, 1952